C. Crousillac,
Splitting Wood.
N° 5,901. Patented Nov. 7. 1848.
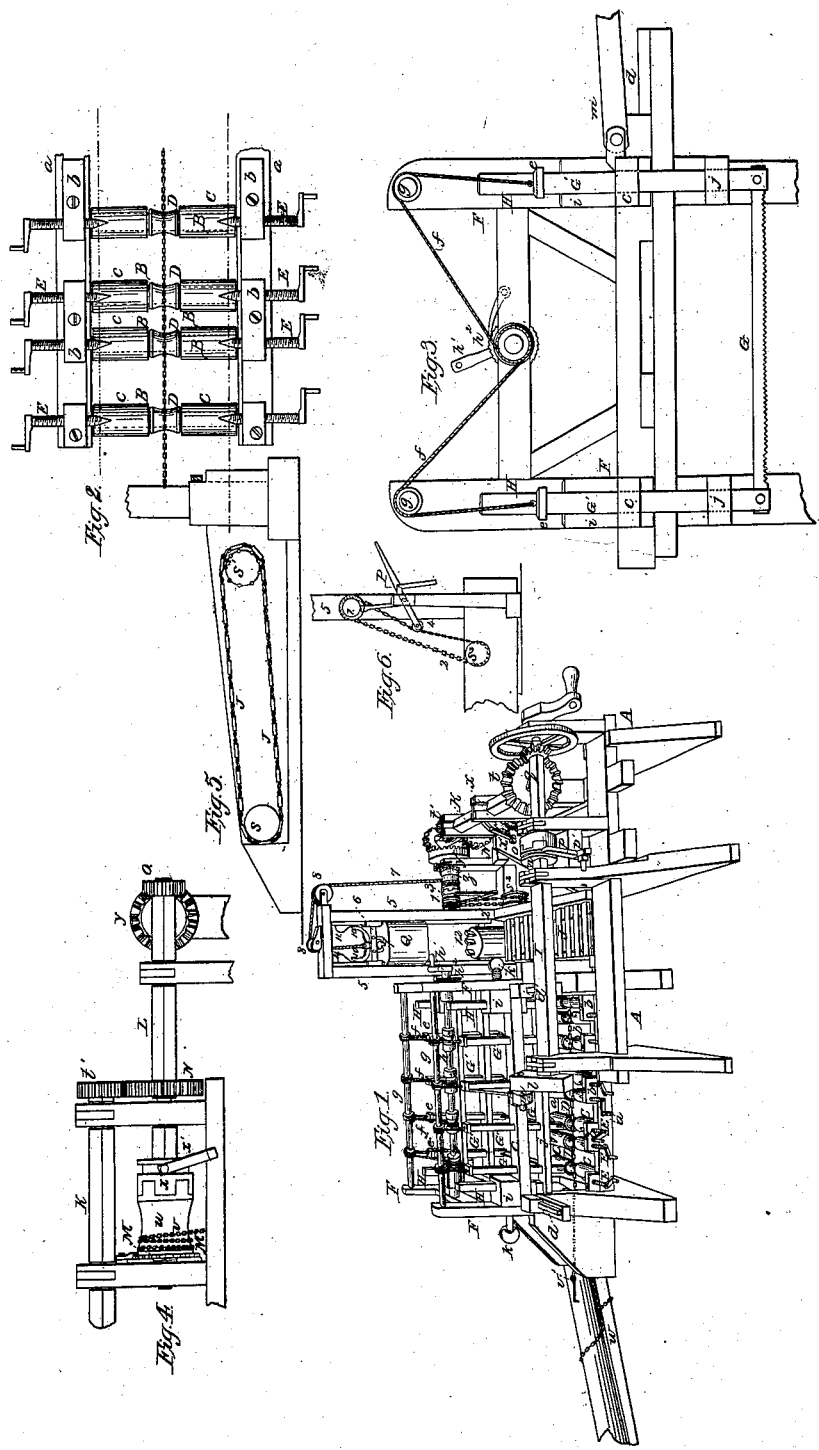

UNITED STATES PATENT OFFICE.

CADET CROUSILLAC, OF NEW ORLEANS, LOUISIANA.

MACHINERY FOR RAISING, SAWING, AND SPLITTING LOGS.

Specification of Letters Patent No. 5,901, dated November 7, 1848.

*To all whom it may concern:*

Be it known that I, CADET CROUSILLAC, of New Orleans, in the parish of Jefferson and State of Louisiana, have invented a new and useful Machine for Raising, Sawing, Conveying, and Splitting Logs into Fire-Wood, which is described as follows, reference being had to the annexed drawings of the same, making part of this specification.

Figure 1, is a perspective view of the machine. Fig. 2, is a horizontal section, or birds eye view of the rollers on the horizontal shafts, over which the logs are drawn, and horizontal screws, for securing the logs, during the operation of sawing. Fig. 3, is a vertical cross section through the vibrating saw frame. Fig. 4, is an end elevation of a portion of the end of the machine, showing the windlass around which the chain passes, for drawing the log under the saws,—horizontal shaft upon which it turns, &c. Fig. 5, is a vertical section through the endless chain for conveying the logs under the weight or monkey, to be split, after being sawed. Fig. 6 is a sectional view showing the lever, grooved roller, for tightening the chain in order to cause the endless conveyer to move—the said chain slipping loosely over the pulleys.

Similar letters in the figures refer to corresponding parts.

The nature of this invention consists in drawing the logs of wood, found floating in rivers, or other logs, over horizontal rollers, and under a gang of horizontal saws, at right angles to the same, attached to vertical stems, moving in mortises in a vibrating frame, and securing said logs by means of horizontal screws, pointed at their ends, and driven into the sides of the same, and sawing them into blocks of any desired length, and forcing the blocks or portions of the logs, after the screws are withdrawn from the same, forward on to an endless chain of parallel slats, by which they are conveyed, and discharged on their ends, under an iron weight, moving vertically between slides and grooves, similar to the monkey of a pile driver, and after inserting the sharpened edges of iron wedges, in their upper ends, causing said weight to fall on said wedges and split, the blocks into pieces of the required size for fire wood;—the machinery necessary for the accomplishment of these objects being arranged together, within a suitable frame and operated by steam, or other power.

A is the frame of the machine, composed of strong timbers mortised and tenoned together and of suitable size and form, to contain and correspond with the arrangement of the parts of the machine.

B are horizontal transverse shafts of iron or other suitable material, inserted at their ends into longitudinal timbers $a$, of the frame, and arranged on the same horizontal line, at different distances apart,—every other space between them, being greater, than the intervening spaces, and the distance between the centers of every other space, being equal to the spaces between the saws, and to the length of the fire wood to be cut and split. C are hollow cylinders or rollers, made of wood or other suitable material, surrounding the shafts B, and turning on the same, one near each end.

D are grooved pulleys, also turning on these shafts, at their centers, between the hollow cylinders or rollers.

E are horizontal screws, pointed at their inner ends, arranged immediately over the centers of the shafts, and parallel with the same, and passing through female screws, formed in metallic blocks $b$, secured on the horizontal timbers $a$, of the frame, and provided with cranks on their outer ends for turning the same.

F is the saw frame, composed of four upright timbers, connected together by transverse, and longitudinal timbers $c$, and having dove tailed grooves, bound with brass, formed in the lower edges of the lower transverse timbers, into which are inserted corresponding shaped ways or tongues $d$ similarly bound, formed on the upper transverse timbers of the frame, for guiding the saw frame in its vibratory movements.

G are horizontal cross cut saws, arranged at equal distances apart, over the centers of the wide spaces between the rollers C, and shafts B, and parallel to the same, and secured at their ends to the lower ends of vertical metallic stems G′, passing through openings in the longitudinal timbers c, of the saw frame, and attached at their upper ends,—on which there are formed shoulders e, to cords f passing over pulleys, immediately over them, secured on horizontal shafts g, turning in the uprights of the saw frame, and around windlasses, formed on a horizontal shaft h turning in suitable boxes in the transverse timbers of the saw frame, and provided with a crank h′, and ratchet wheel $h^2$ and pawl, at one end, for raising and suspending the stems and saws.

H are four other vertical metallic stems or bars, passing through the longitudinal timbers c and through openings in oblong blocks i, at the corners of the saw frame, and secured at their lower ends to horizontal longitudinal timbers j, immediately below the longitudinal timbers of the saw frame, and having openings in them, through which the vertical stems of the saws pass, said stems or bars H, being clamped, and prevented from descending in the openings in the blocks i, and longitudinal timbers j of sawframe, by horizontal thumb screws k passing through female screws in the sawframe and blocks, and pressing against the sides of the stems H, in such a manner as to allow of the longitudinal timbers j, attached to said stems H, being raised or lowered toward or farther from the longitudinal timbers c of the saw frame, to regulate the stiffness of the saws, and prevent them from wabbling.

I is a horizontal longitudinal shaft, turning in boxes in uprights of the frame, and having a crank l, on one end, to which is attached a pitman rod m, also connected to the sawframe, for giving motion to the same, and a clutch wheel n, on its opposite end, in which is formed a groove o, for the reception of cogs on the ends of bars p, secured on a horizontal shaft p′, for moving said clutch longitudinally on the shaft, (made square at this end) to throw the cogs on the same in, and out of gear with those on the end of a horizontal shaft q, turning in boxes in uprights of the frame, on the same line as the last mentioned shaft, and having a bevel pinion r, or cog wheel, and a fly wheel and crank, at its opposite end. J is an endless chain of slats, or bars of wood, passing around horizontal rollers s turning in suitable boxes in the frame, and arranged immediately in front of the rollers c slightly inclining upward, across the frame, its upper surface next the rollers c, being on a line with the upper parts of the same, and the driving roller s′ at its left or highest part, being fluted or cogged on its periphery, in order to take a better hold of the same, and having a pulley $s^2$ on one end of its shaft.

K is a horizontal transverse shaft turning in boxes in the uprights in the frame, and having a bevel cog wheel t, at one end, meshing in gear with the pinion r, and a pinion or cog wheel t′, at its opposite end. See Figs. 1 and 4. L is another horizontal shaft, turning in boxes in the same uprights as the last mentioned shaft K, immediately below, and parallel to the same, and having a windlass u, on its rounded part, around which is wound a chain v, passing under rollers or pulleys, under the endless chain, and over the pulleys or rollers D, between the rollers C, on the horizontal shafts B, and attached by a hook v′, to the log to be sawed, for drawing it over the inclined timber w, and rollers C, to its position under the saws, said windlass u having notches or cogs on one end, to which is geared the notches of a clutch x, moving on the square part of the shaft, by cogs, on the ends of bars x′, inserted in a groove in the clutch, and turning on a horizontal shaft, for throwing the windlass in and out of gear with the shaft L. M is a ratchet wheel on the opposite end of the windlass u, on the side of which is arranged a pawl for holding the windlass. N is a cog wheel on the shaft L meshing in gear with the pinion or cog wheel t′.

O is a bevel cog wheel on the end of this horizontal shaft, meshing in gear with a bevel cog wheel y on the end of a horizontal shaft, arranged longitudinally in the frame, and turning in boxes in uprights of the same, and having a drum or windlass z, provided with a ratchet wheel and pawl, and hung loosely on the rounded part, near one end, and a permanent pulley 1, around which is passed a band or chain 2, also passing loosely around the pulley $s^2$ on the end of the roller s′ of the endless chain J, secured near the other end of the same, said drum, or windlass z, being thrown in, and out of gear, with the shaft, by means of a clutch 3, made and operated in a similar manner to the clutch on the windlass shaft L.

P is a lever turning on a pin in the frame, as a fulcrum, and having a pulley 4 at one end, which is pressed against the band or chain 2 passing loosely around the pulley on the ends of the roller $s^2$ of the endless chain J, for tightening the same, and causing the endless chain to revolve. (See Figs. 1 and 6.)

Q, is an iron weight or monkey moving between ways, or guides, on the sides of upright timbers 5, of the frame, inserted in corresponding grooves in the weight, and having a cross head 6, also moving between the ways or guides, attached to a rope 7, passing over pulleys 8 whose horizontal axles, turn in boxes secured to the cross tie of the upright timbers, and wound around the windlass z, which cross head 6, is attached to a notched projection 9 on the top of the weight Q, by notched dogs 10, or levers, turning on pins or fulcrums in the cross head, and curved on their upper ends, so as to strike cams 11, on the ways or guides near their tops, to detach the weight, and allow it to fall, after the manner of the monkey of the ordinary pile driver.

The operation of this machine is as follows: The machine being situated on the bank of the river from which the floating logs are to be drawn, or other desired place, and motion communicated to the horizontal shaft I, by steam or other power, the hook $v'$, on the end of the chain $v$, is driven into the log, and the clutch $x$ on the shaft L, thrown into gear with the windlass $u$, on the same, by turning the shaft to which the cogged bars $x'$, are attached, which causes the windlass $u$, to turn, and wind the chain and draw the log over the inclined timber or way $w$ leading to the river, and the rollers C, to its proper position under the saws, when the windlass $u$, is thrown out of gear with the shaft L by withdrawing the clutch from the same, and the horizontal screws E, turned by their cranks, and their pointed ends forced into the sides of the log, to hold it firmly in its position. The clutch $n$, is then moved by the horizontal shaft $p'$, and cogged bars $p$, so as to gear the two shafts I, $q$, together, and cause the sawframe to vibrate over its guides, by the cranks $l$, and pitman rod $m$, on the end of the shaft I, and the pawl is removed from the ratchet $h^2$ and the saws lowered to the log, and the log sawed into blocks of the required length, the gravity of the saws, and stems $G'$, to which they are attached, being sufficient to give the required downward pressure to the saws, in their progress through the log, and the stem $G'$, passing through the mortises of the longitudinal timbers $c$, $j$, guiding the same, and the descent of the saws arrested by the shoulders $e$ on the stems. The saws are then raised, by turning the crank $h'$, on the end of the horizontal shaft $h$ around the pulleys or windlasses on which, the ropes $f$ attached to the stems $G'$ are wound, and suspended above the log by the ratchet and pawl, and the screws E withdrawn from the blocks, and the chain $v$ detached, and another log drawn forward in a similar manner to the one above mentioned, its end forcing in its progress the sawed logs or blocks forward over the rollers C, and the front block on to the endless chain J, which is caused to revolve by the attendant forcing the pulley 4, on the lever P, against the chain 2, and which turns it, with the assistance of an attendant, at right angles to its former position, and conveys it toward the upright posts 5, and discharges it, with the assistance of another attendant on its end between said upright posts, between which the weight or monkey moves. The clutch 3, on the shaft being previously moved so as to gear the windlass $z$, with the same, in a similar manner to the clutch $x$ on the shaft L, and raise the weight or monkey sufficiently high to allow the discharge of the block, and withdrawn from gear with the windlass, so as to stop its progress upward, and allow it to be suspended by the ratchet and pawl at the end of windlass $z$, until the block is properly arranged between the upright timbers 5, and the wedges 12 are inserted in the upper end of the same. The clutch 3, is then again geared with the windlass $z$, and the weight or monkey raised until the upper curved ends of the dogs 10, strike the cams 11, which disengages the weight from the same, and allows it to fall on the wedges and split the log. The clutch 3, is then again ungeared with the windlass $z$, and the cross head 6 allowed to descend by its own gravity, and attach itself to the weight or monkey, which is again raised in the manner before stated, and the split wood removed to make way for another block, and in this manner the operation is continued; particular care being taken by the attendants to operate the several clutches $n$, $x$, $z$, and lever P, at the proper time, to cause the several operations of drawing the log forward, stopping the same, raising the weight or monkey, and stopping the ascent of the same, and conveying and discharging the blocks under the weight, to take place in their respective orders.

To prevent buckling or punching of the saw the screws E should be arranged in pairs so that two pairs will penetrate each piece of the log to be cut and enter far enough to hold the log firmly and prevent the several pieces from having any movement in any direction until the screws are withdrawn for the purpose of having the pieces pushed forward on to the endless conveyer J. Should the saws not run steady the bar $j$ must be lowered by first loosening the screws $k$ descending the pistons H and tightening the screws $k$. This will have the effect of causing the saws to move through the log with greater precision and exactness.

I do not claim to be the inventor of any of the separate mechanical devices employed in the before described machine for sawing and splitting logs; nor do I claim the employment of steam power to operate the several parts, but What I do claim as my invention and improvement and desire to secure by Letters Patent is—

The before described combination and arrangement of the mechanism represented at $u$, $v$, E, G for raising, holding and sawing large logs into short pieces; with the mechanism J and Q for conveying and splitting the said short pieces into fire wood—the whole constituting one machine, operated by the power of a steam engine applied to the main shaft $q$ in the manner, as herein fully set forth.

In testimony whereof I have hereunto signed by name before two subscribing witnesses this twenty ninth day of February 1848.

CADET CROUSILLAC.

Witnesses:
WM. P. ELLIOTT,
LUND WASHINGTON, Sr.